Sept. 30, 1969    J. BEBBINGTON, JR., ET AL    3,469,465
COMPOSITE DRIVE WHEEL
Filed Oct. 30, 1967

INVENTORS.
JOHN BEBBINGTON, JR.
EDWARD COZZARIN
BY Evan D. Roberts
ATTORNEY.

United States Patent Office 3,469,465
Patented Sept. 30, 1969

3,469,465
COMPOSITE DRIVE WHEEL
John Bebbington, Jr., and Edward Cozzarin, Ithaca, N.Y., assignors, by mesne assignments, to Borg-Warner Corporation, Chicago, Ill., a corporation of Delaware
Filed Oct. 30, 1967, Ser. No. 678,832
Int. Cl. F16h 55/30, 55/12
U.S. Cl. 74—243                    8 Claims

ABSTRACT OF THE DISCLOSURE

Composite sprocket and drive wheel devices are disclosed herein to provide illustrations of this invention. These wheels include a circular plate body which is stamped and provided with radially extending segments along the periphery thereof. The segments are formed into tooth roots and a plastic toothed rim is molded thereover.

Summary of the invention

This invention relates to a composite drive wheel device wherein a plate comprises the wheel body. Radial serrations are provided in the periphery of the plate to provide segments, and the serrations are twisted to provide an axially extending tooth root. A plastic toothed rim is molded over the tooth roots, flange (in those structures where there is one) and the periphery of the plate to provide a composite drive wheel with plastic teeth which are reinforced with more rigid material such as metal or the like. The plastic is held by the tooth roots against peripheral, axial and radial movement with respect to the plate, and the tooth roots provide respective complemental structural support for the plastic rim teeth to transmit drive loads therethrough. Two such plates could be provided in concentric relation with each other with the common plastic rim molded over the respective tooth roots thereof to provide a stronger composite sprocket or gear drive wheel device.

Other advantages and novel aspects of the invention will become apparent upon the following detailed description, in conjunction with the accompanying drawing wherein.

Figure 1:
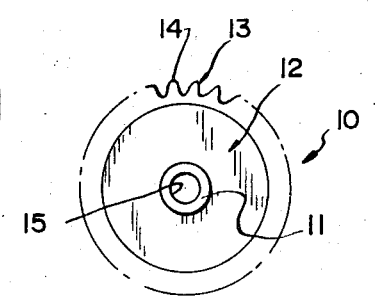
FIG. 1 is a general illustrative representation of the composite drive wheel device of this invention showing a stamped plate with segments on the peripheral teeth formed on the tooth roots with a plastic toothed drive rim molded thereover.

A composite drive wheel generally designated by the numeral 10 (FIG. 1) along with five embodiments thereof (FIGS. 2-9) are shown for the purpose of illustrating and describing this invention. The composite sprocket 10 includes generally, among other things, a hub 11, a stamped plate body 12, tooth roots 13 and a plastic toothed rim 14. The hub 11 is secured to the stamped plate body 12, and is adapted with an aperture 15 to drivingly receive a drive or driven shaft.

In the first embodiment of this invention (FIGS. 2 and 3), a stamped plate 22 is provided with peripheral serrations or projections 23 which are twisted substantially 90° to an axial position to form a tooth root 24. A plastic toothed rim 25 is molded over the teeth 24 and the outer periphery of the plate 22 with teeth 26 thereof in respective substantial complemental relationship with the tooth roots 24.

Figure 2:
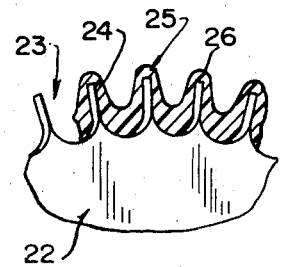
FIG. 2 is a partial view of a first embodiment of this invention showing a stamped plate with twisted serrated tooth roots.
Figure 4:
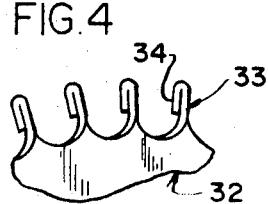
FIG. 4 is a second embodiment of this invention showing a stamped plate with twisted and folded tooth roots.

In the second embodiment of this invention (FIG. 4), a stamped plate 32 is provided with tooth roots 33 similar to the tooth roots 24 of the first embodiment of this invention (FIG. 2). However, the tooth roots 33 of the second embodiment of this invention have a doubled portion 34 on the end thereof. The doubled portion 34 is provided by bending over the end portions of the roots 33. This embodiment of the invention provides an enlarged and strengthened tooth root configuration.

Figure 3:
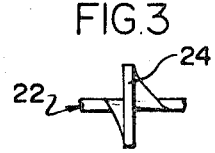
FIG. 3 is a partial peripheral view of a tooth root of the plate shown in FIG. 2.
Figure 5:
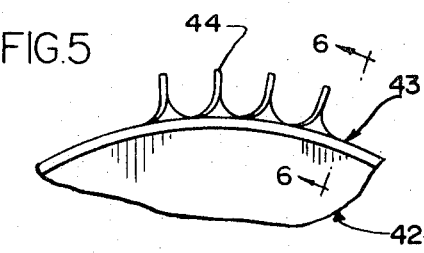
FIG. 5 is a partial view of a third embodiment of this invention showing a stamped plate, formed flange and twisted tooth root segments.
Figure 6:
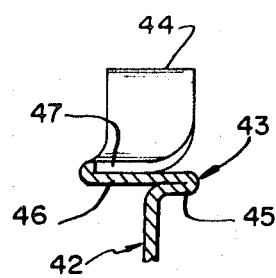
FIG. 6 is a partially enlarged sectional view taken along line 6—6 of FIG. 5 showing the configuration of the formed flange and the tooth roots.
Figure 7:
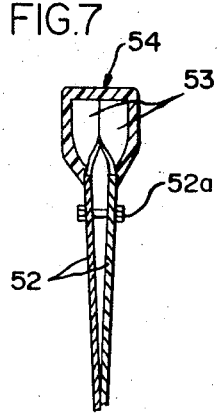
FIG. 7 is a partial radial sectional view of a fourth embodiment of this invention showing two plates similar to that shown in FIG. 2, but which are dished and placed with the convex sides thereof adjacent.
Figure 8:
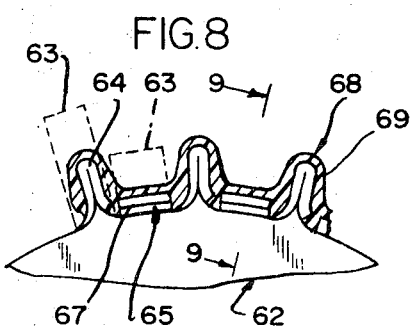
FIG. 8 is a partial view of a fifth embodiment of this invention showing a plate with a series of segments with certain segments twisted in a doubled form, and the remaining segments folded into an axially extending flange.
Figure 9:
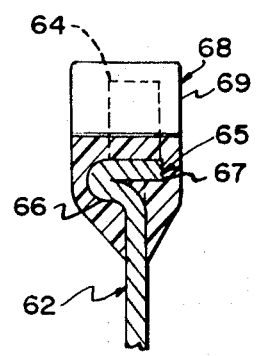
FIG. 9 is a sectional view taken along line 9—9 of FIG. 8 showing a configuration of the tooth root and flange segments of the fifth embodiment of this invention.

In the third embodiment of this invention (FIGS. 5 and 6), a stamped plate 42 is provided with a flange 43 and serrated sections which provide tooth roots 44. The flange 43 is formed by deforming a circumferential portion of the plate 42 in three overlapping folds immediately radially inward from the tooth roots 44. In particular, the plate is deformed in one direction axially away from the plane of the plate 42 to provide an inner flange portion 45 formed axially in the opposite axial direction beyond the plane of the plate 42 to provide an intermediate flange direction 46, and is formed axially in the first direction to substantially the plane of the plate 42 to provide an outer flange portion 47. The tooth roots 44 are formed in the manner similar to that described above with respect to the tooth roots 24 of the first embodiment of this invention (FIGS. 2 and 3).

In the fourth embodiment of this invention (FIG. 7), two stamped metal plates 52 similar to the plate 22 illustrated by the first embodiment hereof (FIGS. 2 and 3), but which are slightly dished are secured together by a bolt or other similar fastening device 52a and are in adjacent concentric relationship with the convex portions thereof adjacent one another and with tooth roots 53 positioned in adjacent aligned relationship. This two-plate embodiment provides a more rigid, much stronger plate relationship in addition to providing a doubled tooth root surface over which a plastic toothed rim 54 is molded to provide the composite toothed drive wheel.

In the fifth embodiment of this invention (FIGS. 8 and 9), a stamped plate 62 is provided with a series of tooth root forms 63 on the periphery thereof shown by the broken lines which are progressively alternately formed into tooth roots 64 and axially extending flanges 65. The tooth roots are provided in much the same fashion as those illustrated in the second embodiment of this invention (FIG. 4), with the exception that the doubled portions extend further radially inwardly. The flanges 65 are provided by laterally deforming the alternate tooth root forms 63 in one direction away from the plate 62 to form an inner flange portion 66. The flanges 65 are also doubled back beyond the plate 62 to form an outer flange portion 67. A plastic toothed rim 68 is molded over the alternate tooth roots 64 and flanges 65 with the teeth 69 thereof in substantial complemental relationship with the tooth roots 64 respectively.

It is to be understood that the invention is not to be limited to the specific constructions and arrangements shown and described, as it will be understood to those skilled in the art that changes may be made without departing from the principles of the invention.

What is claimed is:

1. A composite drive wheel comprising a drive plate body having a circumferential series of radial projections twisted with respect to the plane of said plate body, thereby providing retention and support for a toothed plastic rim molded thereon.

2. A composite drive wheel device as claimed in claim 1 wherein said projections are twisted substantially 90° with respect to the plane of said plate body.

3. A composite drive wheel device as claimed in claim 1 wherein said projections are folded to provide an enlarged and strengthened tooth root.

4. A composite drive wheel device as claimed in claim 1 wherein the circumferential portion of said plate body immediately adjacent the projections is deformed with respect to the rest of said plate body to provide a flange.

5. A composite drive wheel device as claimed in claim 4 wherein said flange comprises three overlapping folds of said plate body.

6. A composite drive wheel device as claimed in claim 1 wherein said plate body comprises two separate dished plates secured together with the convex sides adjacent and the tooth roots thereof in adjacent alignment.

7. A composite drive wheel device as claimed in claim 1 wherein certain of said projections are twisted with respect to the plane of said plate body to provide tooth roots and the remaining projections are deformed in overlapping relationship laterally with respect to said plate to form flanges.

8. A composite drive wheel device as claimed in claim 7 wherein said tooth root projections are also folded double to provide an enlarged and strengthened tooth root.

References Cited

UNITED STATES PATENTS 1,171,923    2/1916    Bordwell.
3,076,352    2/1963    Larsh _____ 74—443

OTHER REFERENCES

German printed application No. 1,129,024, Kallhardt, 5–62.

FRED C. MATTERN, Jr., Primary Examiner

J. A. WONG, Assistant Examiner

U.S. Cl. X.R.

74—439